United States Patent [19]

Hemmerich et al.

[11] 4,062,692

[45] Dec. 13, 1977

[54] CHALKING-RESISTANT TITANIUM DIOXIDE PIGMENT

[75] Inventors: Heinz-Peter Hemmerich; Hans Jürgen Rosenkranz; Wolfgang Papenroth; Aloys Klaeren, all of Krefeld, Germany

[73] Assignee: Bayer Aktiengesellschaft, Leverkusen, Germany

[21] Appl. No.: 683,577

[22] Filed: May 5, 1976

[30] Foreign Application Priority Data

May 23, 1975 Germany .............................. 2522987

[51] Int. Cl.² .............................................. C09C 1/36
[52] U.S. Cl. ............................... 106/300; 106/308 M; 106/309
[58] Field of Search .............. 106/300, 308 M, 308 Q, 106/309; 260/42.14, 42.55, 29.6 MM

[56] References Cited

U.S. PATENT DOCUMENTS

| 3,133,893 | 5/1964 | Newman | 260/42.14 |
| 3,393,165 | 7/1968 | Evans et al. | 260/29.6 MM |
| 3,563,932 | 2/1971 | Varnazy et al. | 260/42.55 |

Primary Examiner—Winston A. Douglas
Assistant Examiner—J. V. Howard
Attorney, Agent, or Firm—Burgess, Dinklage & Sprung

[57] ABSTRACT

A chalking-resistant titanium dioxide pigment is produced by mixing the pigment with a vinyl polymer, in form of an aqueous latex, applying the polymer to the pigment in quantities of about 0.1 to 30 % by weight based on the final pigment and the mixture containing at least about 30 % of water by weight. The polymer is then coagulated, the aqueous phase separated and the pigment-plus-polymer dried. Due to some apparent complexing, the polymer cannot be quantitatively dissolved away from the pigment. The pigment produces chalking-resistant lacquers, paints and coating compositions.

6 Claims, No Drawings

CHALKING-RESISTANT TITANIUM DIOXIDE PIGMENT

This invention relates to a process for the production of chalking-resistant titanium dioxide pigments by aftertreatment with organic polymers, and to the use of these pigments for pigmenting lacquer coatings.

It is known that the photoactivity of titanium dioxide pigments accelerates binder degradation in outdoor paints, which results in chalking of the paints. It is also known that the chalking resistance of titanium dioxide pigments can be improved by processes in which foreign ions are incorporated into the titanium dioxide lattice, followed by inorganic aftertreatment, for example with $Al_2O_3$ — or $SiO_2$-aquate layers. However, even inorganically aftertreated titanium dioxide pigments are not photochemically inert. In addition, inorganically aftertreated titanium dioxide pigments generally show inadequate dispersion properties.

It is also known that titanium dioxide pigments can be organically aftertreated. German Auslegeschrift No. 1,467,442 describes the treatment of titanium dioxide pigments with the reaction products of polyols with alkylene oxides. German Offenlegungsschrift No. 2,001,381 describes the aftertreatment of inorganic pigments with alkyd resins modified by non-drying fatty acids. In both cases, the dispersibility of the products in lacquer binders and plastics is improved. Unfortunately, aftertreatments such as these affect the chalking resistance of titanium dioxide pigments to a not considerable extent.

It is known from U.S. Pat. No. 3,133,893 that organic or inorganic pigments can be coated with vinyl polymers by a method involving polymerizing vinyl monomers in the presence of the pigment in aqueous phase and in the presence of emulsifiers and peroxide catalysts, such as ammonium peroxodisulfate. Products obtained by this method show improved dispersibility in plastics, resins and synthetic fibers. Unfortunately, $TiO_2$-pigments obtained by this process give inadequate gloss values in the pigmenting of lacquers, apart from which the chalking behavior of titanium dioxide is not favorably influenced to any significant extent.

Accordingly, the object of the present invention is to improve the chalking resistance of titanium dioxide pigments by a special organic aftertreatment.

The present invention provides a process for the production of chalking-resistant titanium dioxide pigments by organic aftertreatment with vinyl polymers in aqueous phase followed by separation of the aqueous phase and drying, characterized by the fact that the titanium dioxide pigment is mixed with at least one vinyl polymer, in the form of an aqueous latex, thereby applying the polymer to the pigment, in quantities of at least about 0.1% by weight, based on the final pigment, the water content of the mixture being adjusted to at least about 30% by weight, after which the latex is coagulated in known manner.

Suitable titanium dioxide pigments which may be treated with organic polymers in accordance with the invention are non-aftertreated or inorganically or organically aftertreated anatase or rutile pigments or alkali metal or alkaline-earth metal titanates, such as for example $K_2Ti_6O_{13}$, $Na_2Ti_6O_{13}$, $MgTiO_3$, $Mg_2TiO_4$, $MgTi_2O_5$, $CaTiO_3$.

The "treatment" of the pigment in accordance with the present invention may comprise uniformly coating the inorganic pigment with an organic polymer. However, the coating may also be incomplete and irregular. Under the effect of this coating, the interaction between the surface of the titanium dioxide pigments and the polymers goes beyond the interaction normally encountered in simple mixtures of pigments and polymers. Whereas the polymer component of, for example, titanium dioxide/polystyrene mixtures, of the type obtainable by dispersing titanium dioxide in a solution of polystyrene, followed by precipitation in methanol, can be completely extracted with suitable organic solvents, such as benzene for example, the polymer component of titanium dioxide pigments treated with polystyrene in accordance with the invention can only be extracted to a relatively small extent with the same organic solvents. The extractable polymer fraction of titanium dioxide pigments treated in accordance with the invention generally amounts to from about 20 to 40%.

Polymers of the type which may be obtained from radically polymerizable vinyl monomers are suitable for the treatment of titanium dioxide pigments in accordance with the invention. Monomers of this type are, for example, dienes such as 1,3-butadiene, 2-methyl-1,3-butadiene, 2-chloro-1,3-butadiene; styrene, α-methyl styrene; (meth)acrylic acid, (meth)acrylates such as methyl, ethyl and butyl(meth)acrylate, (meth)acrylamide, (meth)acrylonitrile; vinyl esters such as vinyl acetate and vinyl propionate; vinyl ethers such as methyl, ethyl and isobutyl vinyl ether; vinyl ketones such as methyl vinyl ketone and methyl isopropenyl ketone; allyl compounds such as allyl alcohol, allyl choloride and allyl acetate; vinyl chloride and vinylidene chloride. Preferred vinyl monomers are styrene, methyl acrylate ethyl acrylate, butyl acrylate, methyl methacrylate, ethyl methacrylate and butyl methacrylate.

The treatment of titanium dioxide pigments in accordance with the invention may be carried out both with homopolymers and with copolymers of at least two of the above-mentioned monomers. The polymer content of the products obtained by the treatment according to the invention amounts to about 0.1 to 30% by weight, preferably to about 1 to 20% by weight and, with particular preference, about 2 to 10% by weight.

In the general embodiment of the process according to the invention, a latex is prepared from at least one of the above-mentioned monomers by emulsion polymerization in accordance with standard methods (H. Logemann, "Makromolekulare Stoffe", in Houben-Weyl, "Methoden der organischen Chemie", published by Eu. Muller, Vol. XIV/1, pages 133/356, 433/463, Georg Thieme Verlag, Stuttgart, 1961, the disclosure of which is incorporated herein by reference). The polymers present in latex form have average molecular weights in the range from about 100,000 to several million. The titanium dioxide pigment is then treated with latex by initially mixing the latex with the dry or moist pigment or with an aqueous suspension of the pigment. The water content of the mixture as a whole, consisting of the pigment or pigment suspension and latex, should amount to at least about 30% by weight and preferably to more than about 40% up to about 90% by weight. The polymer is then precipitated by coagulation by any of the methods normally used in emulsion polymerization processes (Houben-Weyl, supra, pages 468–493). To this end, the latex-containing titanium dioxide pigment suspension may be coagulated a) with alcohols such as methanol, ethanol, and isopropanol, or with ketones, such as acetone, or b) with electrolytes in the form of inorganic salts and/or acids and/or lyes.

After the polymer has been precipitated, the titanium dioxide pigment treated with the vinyl polymer is isolated by filtration under suction, washing and drying or simply by spray drying. It is also possible to convert the product into filterable form by freezing and rethawing or to isolate it by concentration through evaporation.

In one preferred embodiment of the process according to the invention, the latex is run with intensive stirring into an aqueous pigment suspension. Finally coagulation of the latex is completed by the addition of water-soluble inorganic salts of polyvalent metal ions, for example $MgCl_2$, $MgSO_4$, $CaCl_2$, $BaCl_2$, $AlCl_3$, $Al_2(SO_4)_3$, $FeCl_2$, $CoCl_2$, $NiCl_2$, $CuCl_2$, $ZnCl_2$ and $HgCl_2$. It is preferred to use $MgCl_2$, $MgSO_4$, $CaCl_2$, $BaCl_2$, $AlCl_3$ and $Al_2(SO_4)_3$. It is possible to use an aqueous solution of the inorganic salt or even the solid salt as such. The salt concentration of the solution optionally used is not critical. In general, about 0.1 to 10% of inorganic salt are required, based on the total weight of the pigment used plus the solids content of the latex used. In cases where alcohols or ketones are used instead of the electrolytes, about 3 to 100% are generally required, based on the weight of the solids content of the latex used.

The treated titanium dioxide pigment may be dried at temperatures of about 10° to 300° C and preferably at temperatures of about 50° to 200° C.

The titanium dioxide pigments aftertreated in accordance with the invention show extremely good resistance to chalking and are suitable for the usual applications of titanium dioxide pigments. The pigments aftertreated in accordance with the invention are particularly suitable for pigmenting lacquers to which they may be added in the usual quantities and by the conventional methods. Lacquers of this kind may contain the usual additives, such as further pigments, fillers, auxiliaries, i.e. levelling agents, anti-skinning agents for example, oximes, etc.

Suitable binders for the coating agents include the binders normally used for lacquers, for example natural resins and their conversion products, such as shellacs, alkyd resins, unsaturated polyester resins, epoxide resins for example based on epichlorhydrin and bisphenol A, phenolic resins such as novolaks, urea and melamine resins, polyurethanes for example based on OH-group-containing polyethers and polyisocyanates, nitrocellulose, polymer resins (plastic lacquers) such as chlorinated rubber.

The process according to the invention is illustrated by the following Examples.

EXAMPLES 1 TO 5

Latices were prepared as follows from the monomers and monomer mixtures identified in Table 1 below. Nitrogen was passed through 250 parts of water for approximately 30 minutes. 100 parts of monomer mixture and 4 parts of a sodium alkyl sulfonate ($C_{12}$–$C_{18}$-alkyl) emulsifier were then added with vigorous stirring while nitrogen was passed over. A solution of 0.5 part of $K_2S_2O_8$ and 0,25 part of $NaHSO_3$ in 20 parts of water was then slowly added dropwise at 50° C, followed by stirring for 4 hours at that temperature.

The required quantity of the required latex was then added with vigorous stirring to the aqueous suspension (approximately 30% $TiO_2$) of the required $TiO_2$-pigment. To produce a $TiO_2$-pigment treated with 10% of polystyrene for example, 90 parts of $TiO_2$-pigment were suspended in 210 parts of water. 37.5 parts of polystyrene latex (N/26 10 parts of polystyrene) prepared as described above were then added with vigorous stirring to the resulting suspension. Finally, precipitation of the latex was completed by the addition of approximately 10 parts of a 10% $Al_2(SO_4)_3$-solution, after which the product was filtered off under suction, washed repeatedly with water and dried. The product yields, based on the total weight of the $TiO_2$-pigment used plus solids content of the latex, were substantially quantitative. $TiO_2$-pigments thus treated with polymers are shown in Table 1.

Table 1

| Example | $TiO_2$-Pigment[1] | Latex[2] | Quantity of latex[3] (% by weight) |
|---|---|---|---|
| 1 | B | 60 styrene 40 butyl acrylate | 5 |
| 2 | B | " | 4 |
| 3 | B | " | 2 |
| 4 | B | 100 methyl methacrylate | 10 |
| 5 | A | 60 styrene 40 butyl acrylate | 10 |

[1]$TiO_2$-pigment A: non-aftertreated rutile pigment $TiO_2$-pigment B: rutile pigment aftertreated with $Al_2O_3$- and $SiO_2$-aquate
[2]Monomer or monomer mixture used for preparing the latex. The figures represent the proportions by weight of the monomers in the mixture.
[3]Quantity of latex used, expressed as the solids content of latex, in % by weight, based on the total weight of the $TiO_2$-pigment plus solids content.

10 g of the product of Example 1 were extracted for 20 hours with benzene in a Soxhlet apparatus. The extract was found to contain 0.16 g of styrene/butyl acrylate copolymer, i.e., only about 32% of the polymer were extractable. (By contrast, the polymer component of a product obtained simply be dispersing $TiO_2$ in a solution of a separately prepared styrene/butyl acrylate copolymer, followed by precipitation in methanol, is completely extractable with benzene in the Soxhlet apparatus).

The products treated with the polymers were ground with an alkyd resin in a ball mill to form lacquers with a pigment volume concentration (PVC) of 15%, based on $TiO_2$. Metal test plates coated with these lacquers were weathered in an Atlas carbon-arc Weather-O-Meter with 8 Corex D-filters and a sprinkling cycle of 17:3.

For comparison, lacquers containing the $TiO_2$-pigments A and B, which have not been treated with a polymer, were prepared and coated on to a metal test plates which were then tested under identical conditions.

The weathered test plates were used for determining the chalking stages by the adhesive-plaster method (DIN 53223). Chalking stage 1 signifies incipient chalking, while chalking stage 5 signifies the highest chalking level (DIN 53230).

Table 2

| | Polymer Comonent (%) | Weather-O-meter weathering in hours up to | |
|---|---|---|---|
| | | Chalking stage 1 | Chalking stage 5 |
| Comparison | — | 280 | 400 |
| Example 1 | 5 | 390 | 590 |
| Example 3 | 2 | 330 | 460 |
| Example 4 | 10 | 300 | 585 |

The non-weathered comparison lacquer had a gloss value of 77, as measured with a 20° gloss meter (Gardner). The lacquers based on the products of Examples 3 an 4 had gloss values of 75 and 61, respectively.

Table 3

| | Polymer component (%) | Weather-O-meter weathering in hours up to | |
|---|---|---|---|
| | | chalking stage 1 | chalking stage 5 |
| Comparison | — | 520 | 920 |
| Example 2 | 4 | 600 | 1250 |

Table 4

| | Polymer component (%) | Weather-O-meter weathering in hours up to | |
|---|---|---|---|
| | | chalking stage 1 | chalking stage 5 |
| Comparison | — | 270 | 375 |
| Example 5 | 10 | 360 | 560 |

It will be appreciated that the instant specification and examples are set forth by way of illustration and not limitation, and that various modifications and changes may be made without departing from the spirit and scope of the present invention.

What is claimed is:

1. In the production of a chalking-resistant titanium dioxide pigment by organic aftertreatment with a vinyl polymer in aqueous phase, separation of the aqueous phase and drying, the improvement comprising mixing the titanium dioxide pigment with a vinyl polymer in form of an aqueous latex, thereby applying the vinyl polymer to the pigment in quantities of at least about 0.1% by weight based on the final pigment, the water content of the mixture being at least about 30% by weight, and then coagulating the latex to separate the polymer-containing pigment from the aqueous phase.

2. A process as claimed in claim 1, wherein the vinyl polymer is made from at least one monomer selected from the group consisting of a diene, styrene, (meth)acrylic acid, (meth)acrylates, (meth)acrylamide, (meth)acrylonitrile, vinyl esters, vinyl ethers, vinyl ketones, allyl compounds and vinyl chloride.

3. A process as claimed in claim 1, wherein the titanium dioxide pigment is treated with about 0.1 to 30% by weight of the vinyl polymer.

4. A process as claimed in claim 1, wherein the after-treated pigment is dried at a temperature of about 10° to 300° C.

5. A process as claimed in claim 1, wherein the after-treated pigment is spray-dried.

6. A process as claimed in claim 4, wherein the vinyl polymer is made from at least one monomer selected from the group consisting of styrene, methyl acrylate, ethyl acrylate, butyl acrylate, methyl methacrylate, ethyl methacrylate and butyl methacrylate, the pigment is treated with about 2 to 10% by weight of the vinyl polymer, and the water content of the mixture is from about 40 to 90% by weight.

* * * * *